United States Patent [19]

Hazlett

[11] Patent Number: 5,328,497
[45] Date of Patent: Jul. 12, 1994

[54] PARTICULATE FERTILIZER DUST CONTROL

[75] Inventor: Scott Hazlett, Sumner, Wash.

[73] Assignee: Georgia-Pacific Corporation, Atlanta, Ga.

[21] Appl. No.: 823,569

[22] Filed: Jan. 21, 1992

[51] Int. Cl.[5] .......................... C05C 9/00; C05G 3/10
[52] U.S. Cl. .................................. 71/28; 71/64.07; 71/64.12; 71/26
[58] Field of Search .............. 71/26, 28, 64.07, 64.11, 71/64.12, 64.13

[56] References Cited

U.S. PATENT DOCUMENTS

| | | | |
|---|---|---|---|
| 3,195,999 | 7/1965 | Chance | 71/64.12 |
| 3,264,084 | 8/1966 | Karcher | 71/24 |
| 3,353,949 | 11/1967 | Nau | 71/26 |
| 3,697,245 | 10/1972 | Dilday | 71/28 |
| 3,734,707 | 5/1973 | Seymour | 71/30 |
| 3,885,946 | 5/1975 | Seymour | 71/30 |
| 4,082,505 | 4/1978 | Nonn et al. | 8/524 |
| 4,208,433 | 6/1980 | Barham, Jr. et al. | 426/69 |
| 4,277,253 | 7/1981 | Walter et al. | 23/313 R |
| 4,587,358 | 5/1986 | Blouin | 564/3 |
| 4,846,871 | 7/1989 | Detroit | 71/64.12 |
| 5,041,153 | 8/1991 | Detroit | 71/25 |

FOREIGN PATENT DOCUMENTS 2191207 12/1987 United Kingdom.

OTHER PUBLICATIONS

"Fertilizer Manual," International Fertilizer Development Center, (1979).

Primary Examiner—Ferris Lander
Attorney, Agent, or Firm—Banner, Birch, McKie & Beckett

[57] ABSTRACT

A composition comprising lignosulfonate, sugar and optionally urea useful in preventing the formation of dust and caking of granular fertilizer particles. The composition has a lower viscosity at room temperature, is more effective in preventing dust and caking than lignosulfonate, urea, or sugar alone or mixtures of lignosulfonate and sugar, and mixtures of lignosulfonate and urea. The composition is preferably sprayed on the fertilizer after granulation, or when blending of the fertilizer particles is completed.

14 Claims, 2 Drawing Sheets

PARTS PER MILLION DUST PRESENT AFTER TREATMENT WITH LIGNIN-UREA-MOLASSES SOLUTIONS

PARTS PER MILLION DUST PRESENT AFTER
TREATMENT WITH LIGNIN-UREA-MOLASSES SOLUTIONS

PARTICULATE FERTILIZER DUST CONTROL

FIELD OF THE INVENTION

The present invention pertains to new and useful compositions used to abate the emission of fertilizer dust particles during the manufacture, handling, transfer, and use of solid particulate fertilizers and to a method for reducing fugitive dust emission. Coincidentally, the composition also reduces the tendency of the fertilizer particles to agglomerate, or cake, during storage and bulk transportation.

BACKGROUND OF THE INVENTION

Inorganic fertilizers such as ammonium phosphates, ammonium nitrates, potassium nitrates, potassium chlorides, potassium sulfates, and the like, all are well known. Methods of manufacturing these inorganic fertilizers, as well as methods of processing the fertilizers into particles via prill and granulation techniques, also are well known. The resulting particulate fertilizers, however, often exhibit an undesirable level of dust formation. The fertilizer granular particles easily break into smaller particles resulting in a substantial amount of dust being created when handled, transported, and when eventually applied to the soil. Also, the granular fertilizer particles often tend to cake when stored and transported in bulk such that substantial amounts of the initial free flowing particulate fertilizer agglomerates into solid, substantially integral masses.

Fertilizer dust emission is an increasingly serious problem creating a growing concern about atmospheric pollution and its possible ecological and toxicological effects. While it is preferable to produce non-dusty fertilizer particles, it often is necessary to resort to special antidust treatments due to the difficulty in manufacturing useable particulate fertilizer that do not emit dust.

The prior art has focused primarily on the treatment of particulate fertilizers with petroleum oils and waxes. However, there are disadvantages involved in using these treatment methods. Oils tend to volatilize and/or soak into the fertilizer with time and lose their effectiveness, while waxes are difficult to handle and often require special heated application equipment. Other proposed treatment methods involve application of an aqueous lignosulfonate solution, other liquid fertilizers, or water to the fertilizer particles. While liquid treatment compositions, such as these, may reduce the fertilizer dust levels, the liquid compositions coated on the fertilizer particles tend to promote caking of the granular fertilizer particles. Therefore, there still exists a need to provide a method of treating granular (particulate) fertilizer particles which not only reduces the amount of dust produced when the fertilizer particles are manufactured, handled, transported, and applied to the soil, but also lessens the fertilizer particles' tendency to cake during storage and bulk transport.

DESCRIPTION OF THE INVENTION

Figure 1:
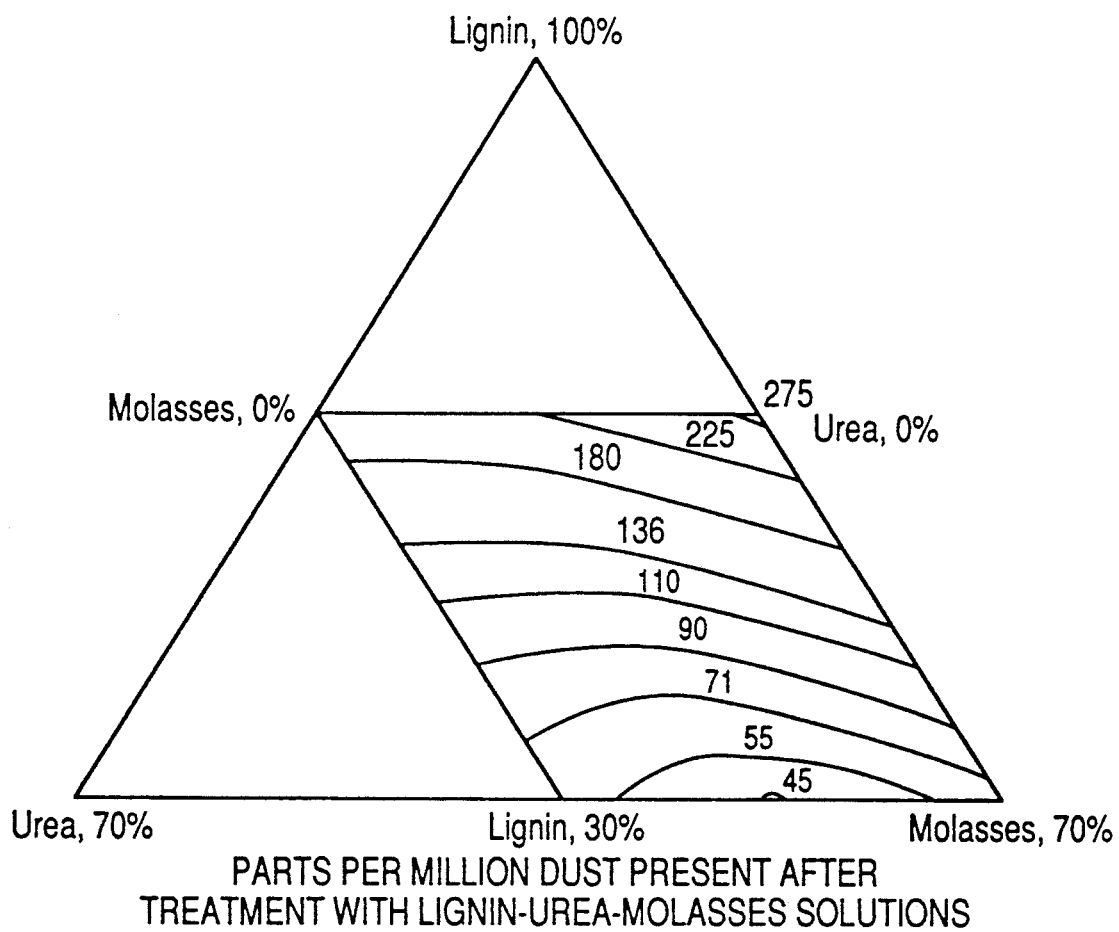
FIG. 1 represents a contour plot showing level of dusting using various compositions comprising lignosulfonate, sugar and urea.

The present invention is based on the discovery that an aqueous solution containing a mixture of lignosulfonate, sugar, and optionally urea, when applied to granular fertilizer particles (i.e. a particulate fertilizer), reduces dust emission common in these solid fertilizers, and reduces the fertilizer particles' tendency to cake during storage and bulk transportation. These lignosulfonate-sugar and lignosulfonate-sugar-urea solutions are environmentally acceptable, and are safe for handling by humans. The compositions containing lignosulfonate, sugar and urea, are particularly easy to apply to particulate granular fertilizers due to their low viscosity, and are more effective in abating the emission of dust or the tendency to cake of such granular fertilizers than either lignosulfonate, urea or sugar alone.

The present invention also is directed to a method of reducing the formation of dust, and reducing caking of fertilizer particles by treating the surface of fertilizer particles with a composition comprising mixtures of lignosulfonate, sugar and urea.

Compositions comprising aqueous solutions of a mixture of lignosulfonate, sugar and optionally urea have been found to be effective in abating dust normally emitted from granular fertilizer particles, i.e. particulate fertilizers, while not significantly contributing to the fertilizer particles' tendency to cake. Various amounts of each of lignosulfonate, sugar, and urea may be utilized depending on the kind of fertilizer, the desired degree of dust abatement, and the desired degree of fertilizer particle agglomeration prevention. Also, various sources of lignosulfonates, sugar and urea may be utilized depending on the same factors set forth above. Skilled practitioners will be able, within the guidelines presented herein, to prepare a composition comprising lignosulfonate and sugar, or a composition comprising lignosulfonate, sugar and urea, which is useful in preventing dust emission and retarding fertilizer particle agglomeration, and is easy to apply to various fertilizers.

In accordance with the present invention, the lignosulfonate used to prepare the lignosulfonate-sugar or lignosulfonate-sugar-urea composition for treating granular fertilizers encompasses not only sulfite lignin, but also sulfonated Kraft lignin. The term "Kraft lignin" refers generally to the substance which is typically recovered from alkaline pulping black liquors, such as are produced in the Kraft, soda, and other well known alkaline pulping operations. The term "sulfonated lignin" refers to the product obtained by the introduction of sulfonic acid groups into the Kraft lignin molecule, as may be accomplished by reaction of the Kraft lignin with sulfite or bisulfite compounds, so that Kraft lignin is rendered soluble in water. The term "sulfite lignin" refers to the reaction product of lignin which is inherently obtained during the sulfite pulping of wood, and is a principle constituent of spent sulfite liquor.

Any type of lignosulfonate, i.e. hardwood, softwood, crude, or pure may be employed. For example, calcium lignosulfonate, sodium lignosulfonate, ammonium lignosulfonate, modified lignosulfonates, and mixtures or blends thereof all may be utilized herein. Lignosulfonates are available from numerous sources in either aqueous solution or dried powder forms. Lignosulfonates other than calcium, sodium, or ammonium lignosulfonate include, but are not limited to, zinc, magnesium, iron, and copper lignosulfonate. Furthermore, any commercial lignosulfonate including different bases, which may be fermented or unfermented, are within the scope of the present invention.

The amount of lignosulfonate used in compositions according to the present invention typically ranges from about 10% to about 50% by weight of lignosulfonate solids based on the total weight of lignosulfonate-sugar-urea solids in the composition. More preferably, the lignosulfonate is used in an amount within the range of from about 10% to about 40% by weight, and most preferably, in an amount within the range from about 10% to about 30% by weight of the composition.

Any type of sugar may be used in preparing the aqueous solution of the present invention. Commercially available granulated sugar, and molasses of citrus, cane or beet sugars, containing monosaccharides, such as glucose, fructose, or dextrose, disaccharides, and polysaccharides are examples of commonly used sugars. The sugar preferably is employed in the aqueous solution of the present invention at a concentration within the range of from about 20 wt % solids based on lignosulfonate solids in the composition, to about 400 wt %. Preferably, the sugar is used in an amount of from about 50 wt % to about 300 wt % based on lignosulfonate solids. More preferably, the sugar is used in an amount of from about 100 wt % to about 275 wt % based on lignosulfonate solids. In other words, from about 0.2 to about 4 parts by weight sugar are used per part by weight lignosulfonate in the composition; preferably about 0.5 to 3.0 parts per part, more preferably about 1.0 to 2.75 parts per part lignosulfonate is used.

Compositions of the invention containing only lignosulfonate and sugar typically will contain, on a water-free basis, about 10 to 50% lignosulfonate and the balance sugar. Preferably the compositions will contain between about 15 and 25% lignosulfonate and conversely 85 to 75% sugar.

Urea, an optional component in the aqueous solution of the present invention, comprises the balance of the composition and generally is used in an amount within the range of from about 0 wt % urea up to about 300 wt % based on lignosulfonate solids. Again, as alternatively expressed this corresponds to up to about 3 parts of weight urea per part by weight lignosulfonate. Conventional prilled urea can be used. Preferably, the amount of urea in the composition is within the range of from about 20 wt % to about 200 wt % based on lignosulfonate solids, and more preferably from about 50 wt % to about 150 wt % based on lignosulfonate solids. When urea is used, the viscosity of the composition is lowered making it easier to apply the aqueous solution to the granular fertilizer particles.

Particularly useful compositions are those that consist of at least about 10 wt % up to about 50 wt % lignosulfonate solids, at least about 10 wt % up to about 80 wt % sugar solids, and up to about 50 wt % urea based on the total solids of the composition. Preferably, compositions according to the present invention contain from about 10 wt % to 40 wt % lignosulfonate solids, from about 20 wt % to 60 wt % sugar, and from about 10 wt % to 40 wt % urea, based on the total solids of the composition.

A composition meeting the above limitations is particularly effective in preventing dust formation and caking in particulate fertilizers. In addition to the effect of the relative amounts of lignosulfonate, sugar and urea on the effectiveness of the composition of the present invention, the total solids content of the aqueous solution used for treating the particulate fertilizer also is important. If the solids content of the aqueous solution is too low, (i.e., the water content is high), fertilizer caking may become a problem, whereas if the solids content is too high, the viscosity of the solution may make it difficult to handle and the limit of solubility of urea in the aqueous solution may be reached. The total solids content in the aqueous solution typically is within the range from about 40 wt % to about 80 wt %. More preferably, the total solids content is within the range of from about 50 wt % to about 70 wt %, and most preferably, within the range of from about 55 wt % to about 65 wt %.

Aqueous solutions containing these relative amounts of lignosulfonate, sugar and optionally, though preferably, urea at the noted total solids concentration are considered to contain a dust preventive amount of lignosulfonate and sugar and a dust preventive-enhancing amount of urea. Compositions according to the present invention are prepared simply by mixing the individual components, in any order, in water. After initial preparation, the solids content of the composition may be adjusted downwardly by adding a sufficient amount of additional water to bring the solids content of the composition to a desired level, such as within the range of from about 40% to about 80%. Skilled practitioners will recognize that the addition of water to the composition does not have any adverse effect, other than those noted above, on the overall effectiveness of the composition. The addition of water results in a composition easier to apply to a granular fertilizer by conventional spraying techniques.

The desired amount of each of the three individual components of the composition varies depending upon the degree of dust control desired, the degree of cake-prevention desired, and the type of fertilizer treated. Skilled practitioners recognize that optimizing the dust abatement composition of the present invention for various fertilizers depends in part on the nitrogen content of the fertilizer as well as the degree of dust reduction and caking prevention desired and a trade-off with the level of use of the aqueous solution.

The production of particulate fertilizers which can be treated for fugitive dust control in accordance with the present invention is well known and need not be described in detail. Such particulate fertilizers include ammonium phosphates, ammonium sulfate, ammonium nitrate, potassium nitrate and the like.

For example, when conventionally producing granular ammonium phosphate, phosphoric acid typically is neutralized with ammonia in a series of ammoniation reaction tanks where the heat of reaction evaporates a part of the water introduced with the acid. The extent of ammoniation normally is controlled to yield a slurry composition ranging from monoammonium phosphate to about two-thirds diammonium phosphate, depending on the grade of product desired. This slurry then is transported to a pugmill or blunger where it is granulated by mixing with recycled product fines. The granules then are dried and screened to provide a product fraction and a finer recycle fraction. After screening, the granulated fertilizer particles may be blended together to provide a mixture of fertilizer particles having various sizes.

Recycle ratios of the product fines on the order of 8:1 are required for proper control of granulation. In one variation of the above process, a rotary drum granulator may be substituted for the blunger. Products made in this manner may contain about 11% N and 21% P, about one-third monoammonium and two-thirds diammonium phosphate. Other grades such as one containing 16% N and 8.7% P and another with 13% N and 17% P may be made by adding sulfuric acid to the ammoniators, in which case the product may also contain ammonium sulfate. In still another variation, unfiltered extract from a phosphoric acid plant may be used to produce lower grades that contain calcium sulfate.

Diammonium phosphate containing about 18% N and about 20% P also may be made by a process in which phosphoric acid is neutralized with ammonia in a rotary drum granulator. Heated air and dry recycled fines may be introduced in the granulator to reduce the moisture content to the proper level for granulation. The gases leaving the granulator then can be scrubbed with the incoming acid. Typically, the product then is dried and screened.

Another method of making a fertilizer containing about 18% N and about 20% P utilizes a rotary granulation drum. Phosphoric acid may be neutralized in a prereactor with anhydrous ammonia to an $NH_3:H_3PO_4$ mole ratio of about 1.3, (a point near the maximum solubility of the system). The slurry thus produced then may be fed to the granulator along with recycled fines. Additional ammonia may be added in the granulation step to give a mole ratio of about 2, (a point of minimum solubility). The excess ammonia required to drive the reaction to diammonium phosphate may be recovered by scrubbing the exhaust gases with the incoming acid before it is fed to the prereactor. Typically, the product from the granulator then is dried and screened. In addition to the product, a large variety of grades rich in diammonium phosphate can be conventionally produced by neutralizing with ammonia-ammonium nitrate solutions rather than anhydrous ammonia, substituting sulfuric acid for part of the phosphoric acid, or adding various solid fertilizer ingredients to the ammoniator.

Ammonium nitrate may conventionally be produced in granular form substantially as described by the above processes by initially starting with the neutralization of nitric acid with ammonia in the ammoniation reaction tanks. Similarly, potassium nitrate may conventionally be produced in granular form from potassium chloride and sodium nitrate while ammonium phosphate may conventionally be produced in granular form from ammonia and phosphoric acid.

These particulate fertilizers can be treated for fugitive dust control in accordance with the method of the present invention simply by treating the surface of the granular fertilizer particles with the composition of the invention, i.e., an aqueous solution of lignosulfonate, sugar and optionally, though preferably, urea. The composition of the invention typically is applied to the fertilizer by spraying the fertilizer particles with the composition of the invention either in the blending or manufacturing process. The surface of the fertilizer particles can be treated with the aqueous solution by adding the liquid composition either to the recycled fines, or directly to the granulators during fertilizer granulation. For example, the composition of the invention can be incorporated in the recycled fines and sprayed onto the particles within the granulators. Another particularly preferred method of spraying a composition comprising an aqueous solution of lignosulfonate, sugar and optionally though preferably, urea is to spray the composition onto the particulate fertilizer after granulation. Yet another preferred embodiment of the method of the invention is to spray a composition comprising an aqueous solution of lignosulfonate, sugar and optionally, though preferably, urea onto the fertilizer when blending of the fertilizer particles is completed.

Any method of spraying the fertilizer particles can be used according to the present invention. For example, spraying can be carried out by using a fine mist, air atomization, an airless sprayer, pressurized sprayer, and the like. Preferably, the fertilizer particles are sprayed using a fine mist or an airless spraying technique.

In accordance with the method of the invention, the level of treatment using a lignosulfonate-sugar or lignosulfonate-sugar-urea composition is dependent, among other things, upon the fertilizer being treated, the amount of dust control desired, and the degree of caking permitted. For example, a suitable level of treatment uses from about 0.2% to about 6% by weight lignosulfonate-sugar or lignosulfonate-sugar-urea solids on fertilizer solids. Normally, other than at very high solids content, application of the lignosulfonate-sugar or lignosulfonate-sugar-urea composition in an amount above about 6 wt % solids on solids to the particulate fertilizer should be avoided because the excessive level of water that accompanies such application level may contribute to caking. Use of below about 0.2 wt % treatment solids on fertilizer solids may not result in satisfactory dust control.

Figure 2:
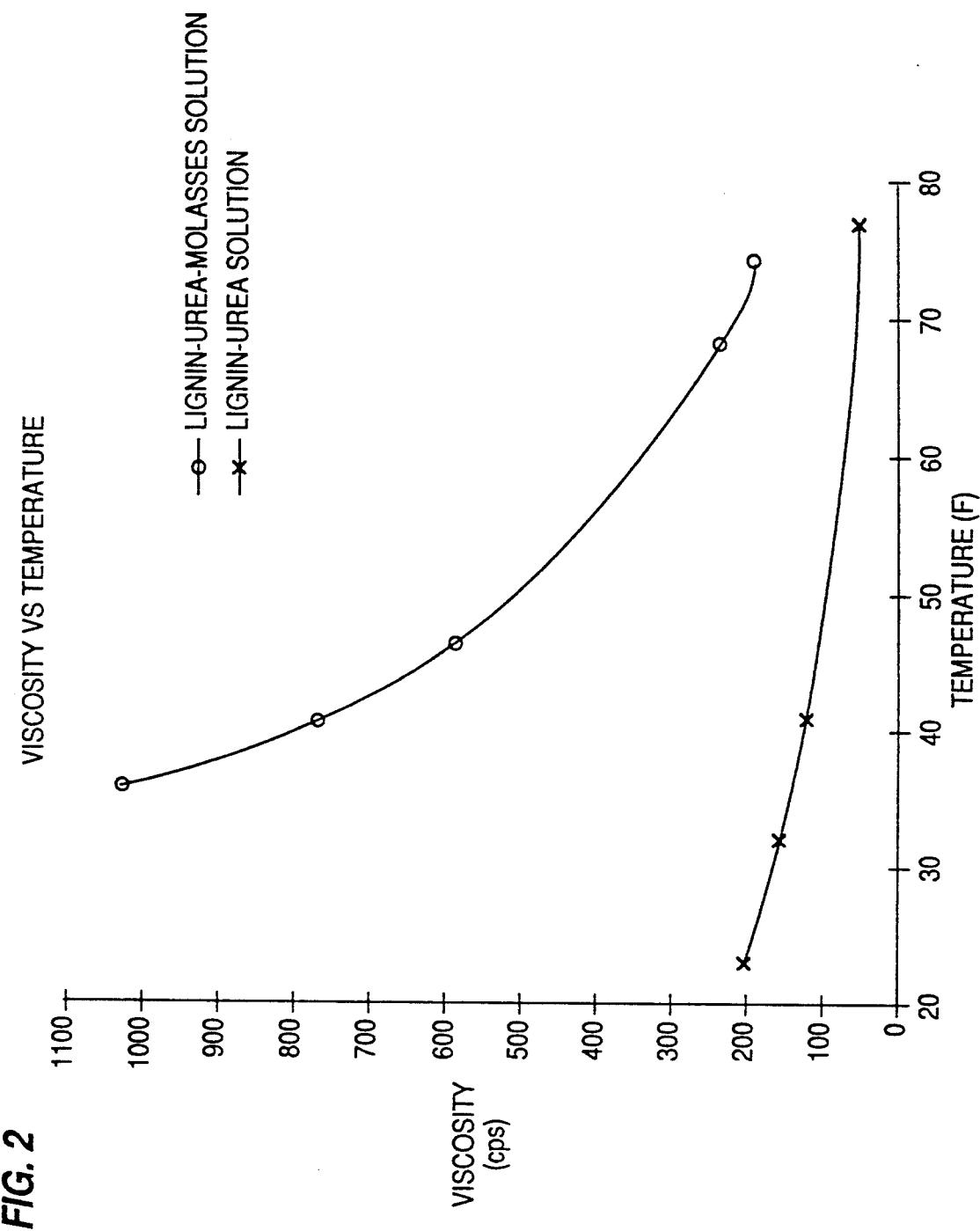
FIG. 2 illustrates the relationship between viscosity and temperature for a composition of the invention, and a comparative composition comprising an aqueous solution of only lignosulfonate and urea.

Aqueous solutions containing a combination of lignosulfonate, urea and sugar exhibit low viscosities suitable for use even in cold climates. As shown in FIG. 2, aqueous solutions of lignosulfonate, sugar and urea have a lower viscosity than compositions containing a combination of lignosulfonate and urea. In the past, the use of aqueous compositions for dust control in granular fertilizers became difficult at low temperatures. It normally had been necessary to apply such aqueous compositions at temperatures well above the ambient temperatures often encountered during the fall and winter in many regions in the United States.

Due to the low viscosity of the preferred compositions of the present invention containing lignosulfonate, sugar and urea, the method of the present invention may readily be carried out at temperatures within the range of from about 32° F. to about 130° F. If possible, the method of the invention should be conducted at temperatures within the range of from about 65° F. to about 100° F., and more preferably from about 70° F. to about 90° F. Because a lignosulfonate-sugar-urea composition has a low viscosity compared to aqueous compositions comprising lignosulfonate-urea, however, the method of the invention remains manageable even at temperatures lower than 32° F., (i.e., a common temperature at fertilizer facilities in the snow belt). While the method of the invention may be carried out on fertilizers at temperatures lower than 32° F., it remains preferable to apply the lignosulfonate-sugar or lignosulfonate-sugar-urea compositions at a temperature, within the higher, above-mentioned ranges.

The following examples illustrate the use of compositions comprising lignosulfonate, urea and sugar on granular fertilizer particles to prevent the formation of dust.

EXAMPLE 1

Aqueous compositions comprising LIGNOSITE ® 50 brand lignosulfonate, a 50% by weight solution of calcium lignosulfonate, urea, and cane molasses were sprayed on about 350 grams of granular diammonium phosphate. Two compositions were sprayed using a fine mist sprayer at a 1 wt % lignosulfonate-sugar-urea solids on fertilizer solids. A third sample was untreated. The three samples of fertilizer particles then were individually mixed, weighed, and dropped through a 9 ft³/m counter-current airstream. The samples then were re-weighed to determine the resulting dust loss. The results of the three samples are shown in Table 1:

TABLE 1

| Sample | Lignosulfonate 50% sol'n (wt %) | Molasses 72% sol'n (wt %) | Urea (wt %) | Dust (ppm) |
|---|---|---|---|---|
| A | 30 | 36.7 | 33.3 | 97 |
| B | 30 | 53.35 | 16.65 | 200 |
| C | — | — | — | 1,590 |

As can be seen from the above Table 1, fertilizer particles treated with lignosulfonate-sugar-urea solutions have much lower dust emission than untreated fertilizer particles.

EXAMPLE 2

Compositions comprising an aqueous solution of LIGNOSITE® 50 brand lignosulfonate, a 50% by weight aqueous solution of calcium lignosulfonate, urea, and molasses (79.5° Brix) were applied to a granular ammonium phosphate fertilizer. The fertilizer particles were simply sprayed with the composition after granulation. Thirteen samples of the composition were prepared having varying amounts of the individual constituents. LIGNOSITE® 50 calcium lignosulfonate was used as a 50 wt % solution in the composition in an amount ranging from about 30 to about 66.7 wt %. Urea was used in an amount within the range of from about 0 to about 33.3 wt %, and molasses was used as a 72 wt % solution in an amount within the range of from about 0 to about 70 wt %. Each sample was applied to the fertilizer in an amount of 1 wt % solids per fertilizer solids. The amounts of lignosulfonate, sugar, and urea, and the amount of dust formed from the fertilizer particles after handling are tabulated in Table 2. A pre-weighed sample of treated fertilizer particles was allowed to fall vertically and counter-current to air in a 9 ft³/min tube comprising baffles. The sample was withdrawn from the bottom of the tube, and weighed. The difference in weight of the fertilizer particles represented the amount of dust emitted.

TABLE 2

| Sample | 50% Lignosulfonate (wt %) | Urea (wt %) | Molasses 72% sol'n (wt %) | Dust (ppm) |
|---|---|---|---|---|
| 1 | 30 | 33.3 | 36.7 | 60 |
| 2 | 39.175 | 8.325 | 52.5 | 88 |
| 3 | 57.525 | 8.325 | 34.15 | 180 |
| 4 | 39.175 | 24.975 | 35.85 | 71 |
| 5 | 30 | 0 | 70 | 65 |
| 6 | 30 | 16.65 | 53.35 | 47 |
| 7 | 66.7 | 0 | 33.3 | 280 |
| 8 | 66.7 | 33.3 | 0 | 200 |
| 9 | 48.35 | 16.65 | 35 | 110 |
| 10 | 57.525 | 24.975 | 17.5 | 145 |
| 11 | 48.35 | 33.3 | 18.35 | 110 |
| 12 | 48.35 | 0 | 51.65 | 140 |
| 13 | 66.7 | 16.65 | 16.65 | 225 |

EXAMPLE 3

The results of the thirteen samples set forth in Table 2 above were used to estimate the optimum composition for treating an ammonium phosphate fertilizer. The results were plotted on a ternary diagram, and contour lines were graphed which represented the amount of dust formed from the fertilizer particles at the various treatment concentrations. The ternary diagram along with the contour lines is shown in FIG. 1. From these contour lines, it can be seen that an optimum amount of dust removal was achieved with a composition comprising approximately 30 wt % LIGNOSITE® 50 calcium lignosulfonate (50 wt % solution), 17.5 wt % urea, and 52.5 wt % molasses (72 wt % solution).

This optimum composition had a total solids content of 70.3%, a viscosity of 275 cps at room temperature, and a density of 11.11 lb/gal. The total solids content was based on a molasses having 72% solids, urea having 100% solids, and lignosulfonate having 50% solids. In order to lower the solids content to minimize the cost of application and control the degree of caking without affecting product performance, water was added in an amount to bring the total solids content to approximately 60%. The resulting composition comprised about 44.8 wt % molasses (72 wt % solution), 14.9 wt % urea, 25.6 wt % LIGNOSITE® 50 calcium lignosulfonate (50 wt % solution), and 14.65 wt % water. The viscosity of the resulting composition was about 55 cps at room temperature, and the density was about 10.63 lb/gal.

COMPARATIVE EXAMPLE 1

The optimum composition produced in Example 3 above was compared to a composition comprising about 66.7 wt % calcium lignosulfonate solids based on total lignosulfonate-urea solids and about 33.3 wt % urea based on total lignosulfonate-urea solids. The relationship between viscosity and temperature of the inventive and the comparative compositions is illustrated in FIG. 2. As can be seen from FIG. 2, the composition of the present invention is advantageous due to its lower viscosity, especially at lower temperatures.

The above examples demonstrate the superior effects of compositions made in accordance with the guidelines set forth herein. Compositions comprising lignosulfonate, sugar, and optionally urea, are superior in preventing the formation of dust, preventing caking, and ease of application when compared to compositions comprising lignosulfonate, urea or sugar alone or mixtures of lignosulfonate and urea.

Although preferred embodiments of the invention have been disclosed herein, those skilled in the art will appreciate that changes and modifications may be made without departing from the spirit of this invention, as defined in and limited only by the scope of the appended claims.

I claim:

1. A composition for reducing fugitive dust in solid particulate fertilizers consisting essentially of an aqueous solution of a mixture of lignosulfonate, sugar, and urea wherein the lignosulfonate is within the range of about 10% to about 40% by weight of total solids in the composition, wherein the sugar is within the range of about 10% to about 80% by weight of total solids of the composition and wherein the urea is within the range of about 10% to about 50% by weight of total solids of the composition.

2. A composition according to claim 1 wherein the amount of sugar is in the range of about 20 wt % to about 60 wt % based on the total solids of the composition.

3. A composition according to claim 2 wherein the amount of urea is within the range of from about 10 wt % to about 40 wt % based on the total solids of the composition.

4. A composition according to claim 1 wherein the lignosulfonate is selected from the group consisting of calcium lignosulfonate, sodium lignosulfonate, ammonium lignosulfonate, zinc lignosulfonate, magnesium lignosulfonate, iron lignosulfonate, and copper lignosulfonate.

5. A composition according to claim 1 wherein the lignosulfonate is selected from the group consisting of calcium lignosulfonate, sodium lignosulfonate, and ammonium lignosulfonate.

6. A composition according to claim 1 wherein the sugar may be selected from the group consisting of molasses of citrus, molasses of cane, and molasses of beet sugar.

7. A method of preventing dust formation and caking in a particulate fertilizer which comprises treating said particulate fertilizer with a composition consisting essentially of an aqueous solution of a mixture of lignosulfonate, sugar, and urea wherein the lignosulfonate is within the range of 10% to about 40% by weight of total solids of the composition, wherein the sugar is within the range of 10% to about 80% by weight of total solids of the composition and wherein the urea is within the range of 10% to about 50% by weight of total solids of the composition.

8. A method according to claim 7 wherein said composition is sprayed on the particulate fertilizer after granulation.

9. A method according to claim 7 wherein said composition is applied to said particulate fertilizer in an amount within the range of from about 0.2% to about 6% solids on fertilizer solids.

10. A method according to claim 7 wherein urea is included in the composition between about 10 wt % to about 50 wt % based on the total solids of the composition, and the amount of sugar is within the range of from about 20 wt % to about 60 wt % based on the total solids of the composition.

11. A method according to claim 10 wherein the amount of urea is within the range of from about 10 wt % to about 40 wt % based on the total solids of the composition.

12. A method according to claim 7 wherein the lignosulfonate is selected from the group consisting of calcium lignosulfonate, sodium lignosulfonate, ammonium lignosulfonate, zinc lignosulfonate, magnesium lignosulfonate, iron lignosulfonate, and copper lignosulfonate.

13. A method according to claim 7 wherein the lignosulfonate is selected from the group consisting of calcium lignosulfonate, sodium lignosulfonate, and ammonium lignosulfonate.

14. A method according to claim 7 wherein the sugar may be selected from the group consisting of molasses of citrus, molasses of cane, and molasses of beet sugar.

* * * * *